(12) United States Patent
Frankenberger

(10) Patent No.: US 9,808,748 B2
(45) Date of Patent: Nov. 7, 2017

(54) CONVEYOR BELT FILTER DEVICE

(71) Applicant: Guido Frankenberger, Wetzlar (DE)

(72) Inventor: Guido Frankenberger, Wetzlar (DE)

( * ) Notice: Subject to any disclaimer, the term of this patent is extended or adjusted under 35 U.S.C. 154(b) by 86 days.

(21) Appl. No.: 14/860,812

(22) Filed: Sep. 22, 2015

(65) Prior Publication Data
US 2016/0096126 A1 Apr. 7, 2016

(30) Foreign Application Priority Data

Oct. 6, 2014 (DE) .................. 10 2014 220 196

(51) Int. Cl.
*E02B 8/02* (2006.01)
*E03F 5/14* (2006.01)
*B01D 33/333* (2006.01)
*B01D 33/056* (2006.01)

(52) U.S. Cl.
CPC ......... *B01D 33/333* (2013.01); *B01D 33/056* (2013.01); *E02B 8/023* (2013.01); *E02B 8/026* (2013.01); *E03F 5/14* (2013.01)

(58) Field of Classification Search
CPC .............. B01D 33/0058; B01D 33/056; B01D 33/333; B01D 33/80; E02B 8/023; E02B 8/026; E03F 5/14
USPC ......................................... 210/158, 160, 400
See application file for complete search history.

(56) References Cited

U.S. PATENT DOCUMENTS

| | | | | |
|---|---|---|---|---|
| 4,360,426 A * | 11/1982 | Wetzel | ................. | B01D 33/333 210/158 |
| 4,582,601 A * | 4/1986 | Strow | ................. | B01D 33/327 210/161 |
| 5,242,583 A * | 9/1993 | Thomas | ............... | B01D 33/056 210/160 |
| 5,415,766 A * | 5/1995 | Quick | ................. | B01D 33/333 210/160 |
| 6,294,085 B1 * | 9/2001 | Bache | ..................... | E02B 8/026 210/160 |
| 7,510,650 B2 | 3/2009 | Wilcher et al. | | |
| 2006/0070858 A1 * | 4/2006 | de Swardt | ............ | B01D 33/333 198/803.2 |
| 2011/0139693 A1 * | 6/2011 | Frankenberger | ........ | E02B 8/026 210/160 |

FOREIGN PATENT DOCUMENTS

WO  WO 98/22662  *  5/1998

* cited by examiner

*Primary Examiner* — Christopher Upton
(74) *Attorney, Agent, or Firm* — King & Schickli, PLLC

(57) ABSTRACT

A conveyor belt filter device for mechanically cleaning a polluted liquid includes an endless filter belt formed by pivotably interconnected filter elements, the filter elements having edges that extend parallel to the joint axes and a filter gap that has a gap seal sealing the filter gap formed between opposing edges of adjacent filter elements, said gap seal having a compressible sealing strip arranged on one filter element edge, wherein an inflow strip is arranged at the opposite edge, the flow impinging on the inflow surface of the inflow strip, said inflow strip extending parallel to the sealing strip and having a sealing surface located opposite of the inflow surface and is in contact with the sealing strip, a movement gap formed between a strip edge of the inflow strip, said strip edge extending parallel to the sealing strip, and the filter element edge provided with the sealing strip.

9 Claims, 5 Drawing Sheets

Fig. 1
Fig. 2
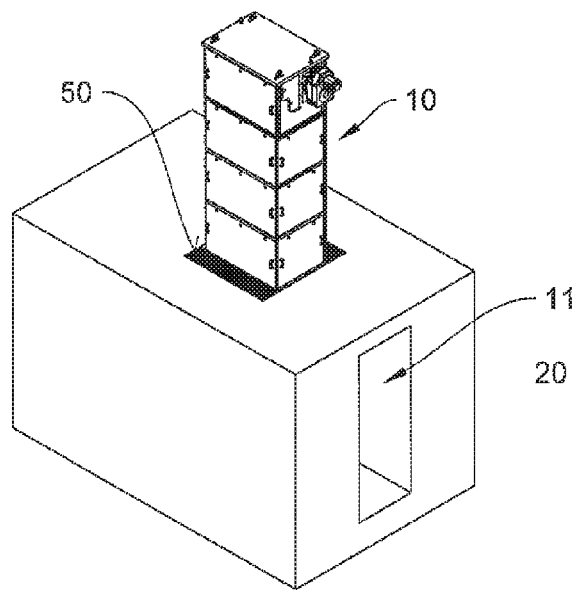
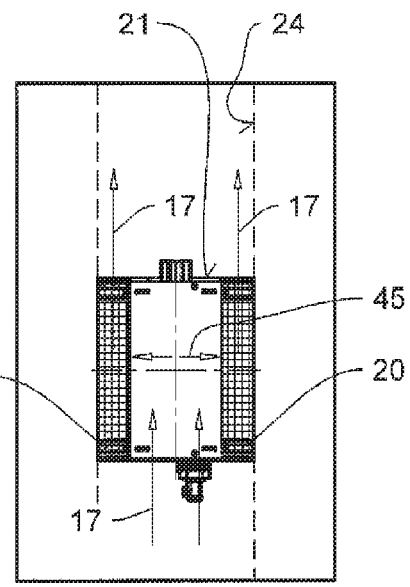
Fig. 3
Fig. 4
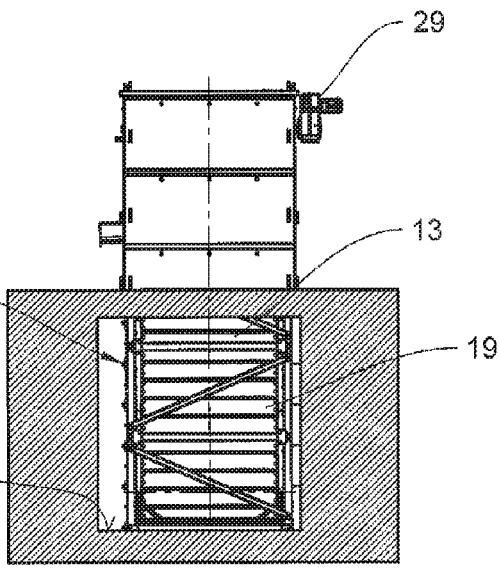

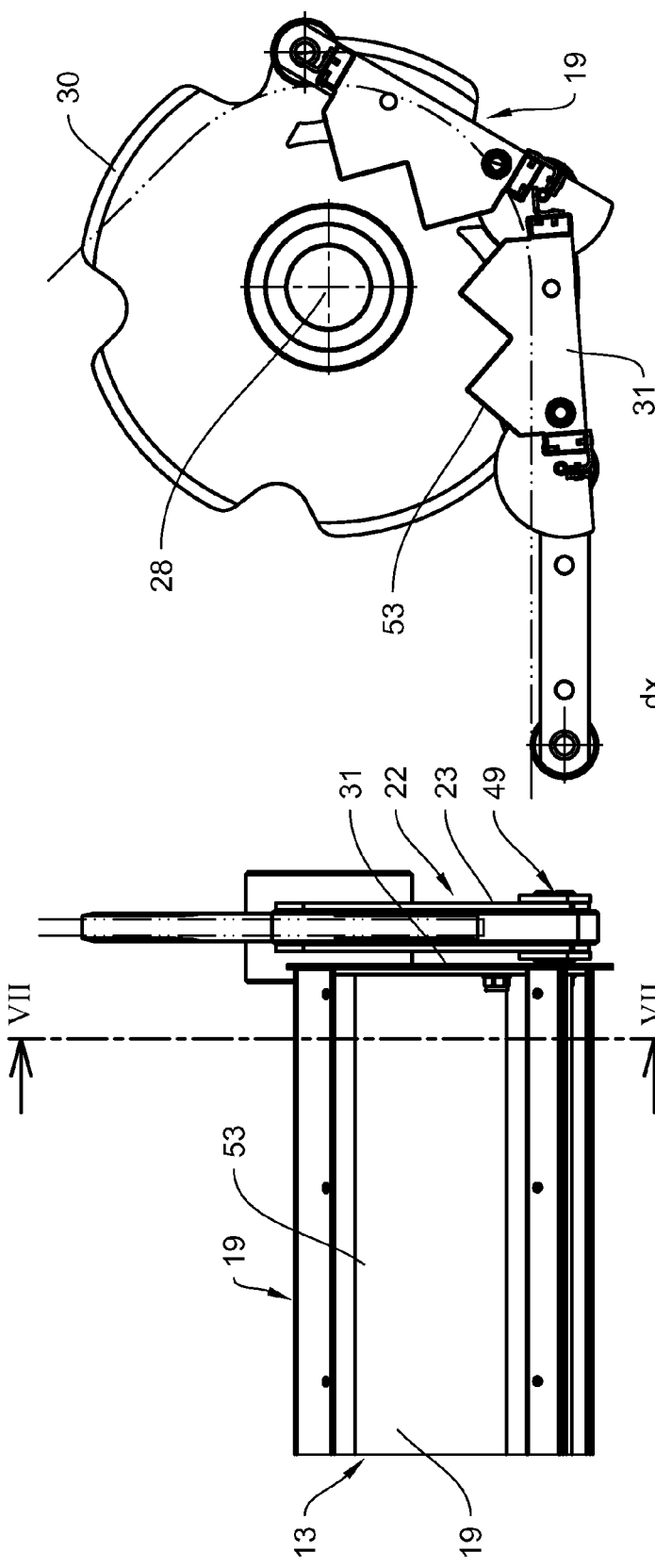

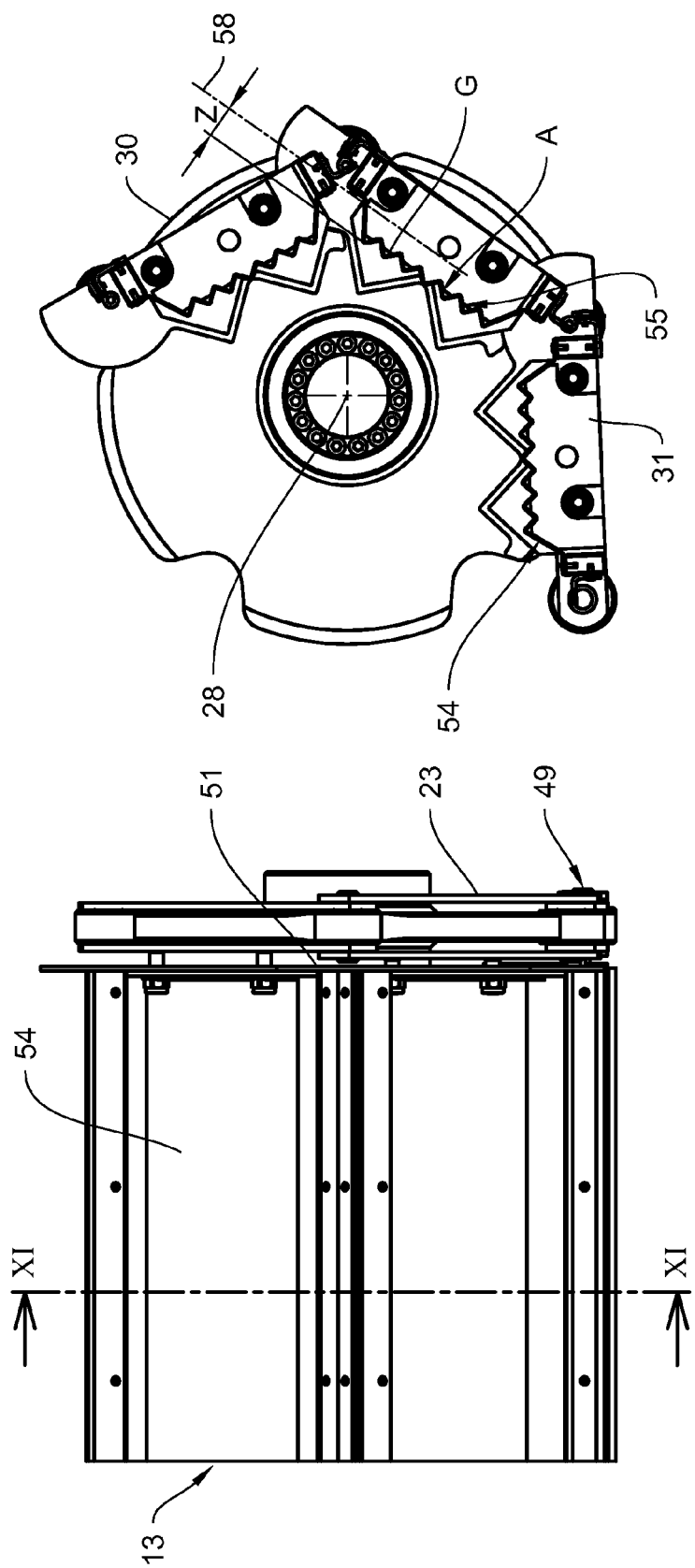

CONVEYOR BELT FILTER DEVICE

This application incorporates by reference German Patent Application No. 10 2014 220 196.9, filed Oct. 6, 2014.

TECHNICAL FIELD

The invention relates to a conveyor belt filter device for mechanically cleaning a liquid that is polluted with solids and flows in a sewer or the like, comprising an endless filter belt formed by filter elements that are connected to one another and can each be pivoted against one another about a horizontal joint axis, and one flexible drive means being provided on either side of the filter belt and being deflected by way of deflection elements in deflection areas, filter elements being laterally attached to said drive means, and a frame that supports the deflection elements and the filter belt, the filter elements having filter element edges that extend parallel to the joint axes and a filter gap that has a gap seal sealing the filter gap being formed between opposing filter element edges of adjacent filter elements, said gap seal having a compressible sealing strip that is arranged on one filter element edge.

BACKGROUND

Conveyor belt filter devices of the kind mentioned above are also called paternoster filter rakes and are primarily used to mechanically clean flowing sewage in sewers formed for this purpose. The sewage flows through the filter elements, and the filter elements remove the filtered matter, which cannot pass through the filter screens, from the sewer. The structure of the filter belt formed by filter elements that are connected to one another and are connected via flexible drive means that are attached on either side of the filter elements leads to the necessity of providing a gap between the individual filter elements that allows relative mobility in particular because of the required relative mobility of the filter elements in the deflection areas. In order to not reduce the effectiveness of sewage filtering by the filter gap, which is formed between the filter elements and through which the sewage can flow bypassing the filter elements, it is known to provide a gap seal in the filter gap, said gap seal having a flexible sealing element which is capable of compensating changes in gap width, which occur in particular in the deflection areas.

For instance, a conveyor belt filter device of the kind mentioned above is known from U.S. Pat. No. 7,510,650 B2, in which a gap seal is provided in a gap formed between opposing filter element edges, said gap seal having a compressible sealing strip, which is arranged on one of the opposing filter element edges.

In the case of the known gap seal, the sealing strip is formed in such a manner that an elastic deformation portion of the sealing strip completely fills the filter gap. The outer contour of the deformation portion is in direct contact with the filter element edges and is exposed to the flow acting on the filter gap. In order to allow coverage of the entire filter gap both in a straight conveying section of the drive means and in the deflection areas, the deformation portion of the known sealing strip is highly compressed in the straight conveying section, whereas in the deflection conveying section the deformation portion is compressed little by comparison, which means that the deformation portion undergoes extensive flexing in the course of a circulation of the filter belt, which leads to material fatigue and necessitates frequent replacement of the sealing strip.

SUMMARY

Hence, the object of the invention is to propose a conveyor belt filter device that allows a reduced maintenance effort.

Said object is attained by a device incorporating the features of claim 1.

According to the invention, an inflow strip, whose inflow surface is impinged on by the flow, is arranged on the filter element edge that is located opposite of the filter element edge provided with the sealing strip. The inflow strip extends parallel to the sealing strip and its sealing surface, which is located opposite of the inflow surface, is in contact with the sealing strip, a movement gap being formed between a strip edge of the inflow strip, said strip edge extending parallel to the sealing strip, and the filter element edge that is provided with the sealing strip.

According to the invention, on the one hand, a cover protecting the sealing strip from the inflow is produced by the inflow strip. On the other hand, the sealing surface of the inflow strip, which is arranged so as to face away from the inflow, forms a counter surface for the sealing strip so that the sealing of the filter gap takes place between the sealing strip and the sealing surface of the inflow strip. The inflow strip can change in its distance with respect to the filter element edge provided with the sealing strip owing to the movement gap formed between the filter element edge on which the sealing strip is arranged and a strip edge, the sealing strip being able move on the sealing surface of the inflow strip so as to compensate the change in gap width between the filter element edges. Thus, the sealing between the filter element edges is maintained when the gap width changes because of a relative shifting of the sealing strip on the sealing surface of the inflow strip without having to undergo an extent of flexing comparable to the state of the art.

In summary, the protection of the sealing strip by the inflow strip combined with the relative shifting ability of the sealing strip on the sealing surface of the inflow strip results in a significantly reduced strain on the gap seal and thus in an increased life span and a reduced maintenance effort for the gap seal.

Preferably, the movement gap is formed in such a manner that the gap width is at maximum in a straight conveying section of the filter belt and at a minimum in a deflection area of the filter belt.

In a preferred embodiment, the sealing strip has an elastic deformation portion and an attachment portion, a connection profile of the attachment portion being attached to a filter element edge in such a manner that the deformation portion is arranged at a distance to the two opposing filter element edges. Thus, it is possible to arrange the sealing strip in a center area of the filter gap at a distance to the two filter element edges so that the distance between the sealing strip and the filter element edges of the conveying section changes to a relatively equal degree with respect to both filter element edges.

Moreover, if in a straight conveying section of the filter belt, the distance between the deformation portion and the filter element edge on which the inflow trip is arranged is larger than the distance between the deformation portion and the filter element edge on which the sealing strip is arranged, the relative movement taking place between the sealing surface of the inflow strip and the deformation portion of the sealing strip in the deflection area can be reduced to a minimum.

It is particularly advantageous if the attachment portion of the sealing strip extends parallel to a connecting web of the connection profile in the inflow direction of the filter elements because in this way the relative mobility of the filter elements is affected as little as possible.

Preferably, the connecting web is formed by a profile leg of a connection profile that is shaped as an L-profile so that, on the one hand, the connection profile can be realized as simple as possible and, on the other hand, the other profile leg of the L-profile can be used in a particularly advantageous manner for the connection with the filter element edge.

In a preferred embodiment, the inflow strip is formed by a profile leg of a connection profile that is attached to the filter element edge so that the connection profile can be simultaneously used to form the inflow strip and for the connection with the filter element edge.

Moreover, if the connection profile for the inflow strip is realized as an L-profile and in particular if the connecting web for the connection with the sealing strip is simultaneously realized as a profile leg of an L-profile, both connection profiles can be realized correspondingly as L-profiles.

An overall particularly highly tailored design, i.e. a design that allows realizing the gap seal with the smallest number of different individual parts possible, is achieved if the filter element edges on which the inflow strip and the sealing strip are arranged are formed by a hollow profile having a rectangular cross-section.

BRIEF DESCRIPTION OF THE DRAWING FIGURES

In the following description, a preferred embodiment of the invention will be explained in more detail with the aid of the drawing.

In the figures:

FIG. 1 shows an isometric illustration of a conveyor belt filter device arranged in a sewer;

FIG. 2 shows a top view of the conveyor belt filter device illustrated in FIG. 1;

FIG. 3 shows a front view of the conveyor belt filter device illustrated in FIG. 1;

FIG. 4 shows a side view of the conveyor belt filter device illustrated in FIG. 1;

FIG. 6 shows a partial illustration of the conveyor belt filter device including filter elements according to FIG. 5 in a deflection area;

FIG. 7 shows a section illustration of the deflection area illustrated in FIG. 6 according to section line VII-VII in FIG. 6;

FIG. 8 shows an enlarged detail illustration of the area marked in FIG. 7 including an illustration of a gap seal;

FIG. 10 shows a partial illustration of the conveyor belt filter device including filter elements according to FIG. 9 in a deflection area; and FIG. 11 shows a sectional illustration of the deflection area illustrated in FIG. 10 according to section line XI-XI in FIG. 10.

DETAILED DESCRIPTION

Figure 5:
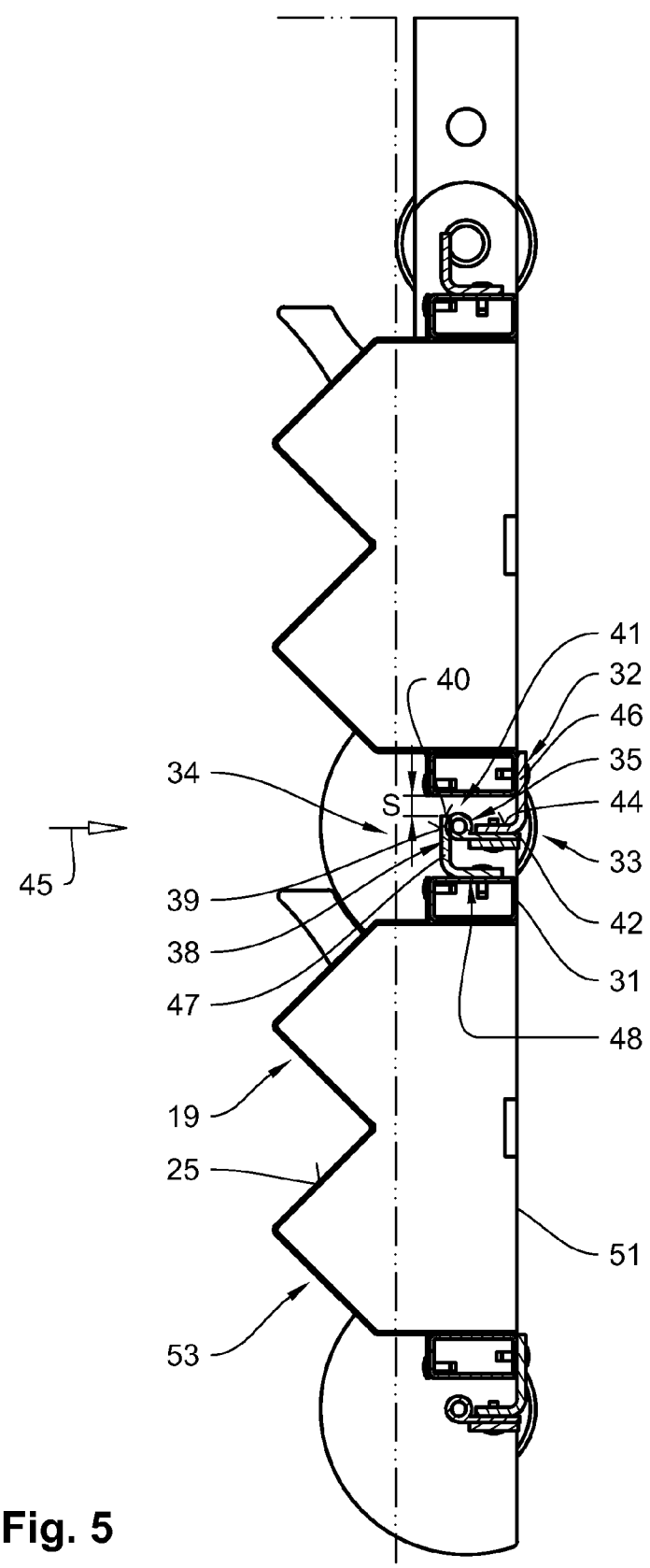
FIG. 5 shows an enlarged partial section illustration of a straight conveying section of the conveyor belt filter device illustrated in FIG. 3 including a first embodiment of filter elements.

FIG. 1 shows an isometric illustration of a conveyor belt filter device 10, which is arranged in a sewer 11. The conveyor belt filter device 10, which is provided with a cover 50 above the sewer 11, has a frame 12, a filter belt 13 guided on said frame 12, a chain drive 14 connected to the frame 12 and to the filter belt 13 and a filtered matter discharge 15, as can be taken in particular from FIGS. 2, 3 and 4.

A liquid loaded with solids flows through the sewer 11 in a flow direction 17 that is visualized by directional arrows in FIG. 2. The conveyor belt filter device 10 extends down to a sewer bottom 18, the conveyor belt filter device 10 being placed in the sewer 11 in a so-called center flow position, as can be taken in particular from FIG. 2, in such a manner that filter elements 19 of the filter belt 12 extend in the flow direction 17 and the flow impinges centrally on the conveyor belt filter device 10. In order to ensure the flow through the filter elements 19 of the filter belt 13, there are lateral bulkhead plates 20 between each of the sewer walls 24 and the frame 12 at the flow inlet side and a central bulkhead plate 21 arranged in the frame 12 at the flow outlet side. Hence, the flow through the filter belt 13 runs transverse to the flow direction 17 in an inflow direction 45.

The chain drive 14 has two drive chains 22, which are composed of chain members 23, as illustrated in particular in FIG. 6, each filter element 19 being received between two chain members 23 in such a manner that the drive chains 22 together with the filter elements 19 form the filter belt 13.

As becomes apparent in particular from a combined view of FIGS. 5, 6 and 7, each of the filter elements 19 has a filter cage 53, which in the present case is formed by a perforated plate material, and an inflow bottom 25 that has a double convex shape toward the inflow direction 45 and which has an M-shaped profile in the case of the illustrated embodiment example.

The drive chains 22 are deflected in upper and lower deflection areas 26, 27 (FIG. 3) via deflection shafts 28 (FIG. 7) mounted in the frame 12, each of which have chain wheels 30, the upper deflection shaft 28 being provided with a drive device 29 (FIG. 4) in the present case.

As shown in particular in FIGS. 5, 6 and 7, the filter elements 19 have plate-shaped side walls 51 for lateral confinement of the inflow bottom 25 and for connection with the chain members 23. Furthermore, it can be taken in particular from FIG. 5, which shows two adjacent filter elements 19 in a straight conveying section 52, that a gap seal 33 is formed between opposing filter element edges 31, 32, which seals a filter gap 34 formed between the filter element edges 31, 32.

As shown in particular in FIG. 8, the gap seal 33 has a sealing strip 35 including an elastic deformation portion 36, which is in elastically deformed contact with a sealing surface 37 of an inflow strip 38. The inflow strip 38 extends parallel to the sealing strip 35, i.e. vertically to the drawing plane in relation the illustration according to FIG. 8. Opposite of the sealing surface 37, the inflow strip 38 has an inflow surface 39 on which the flow impinges. Between a strip edge 40 of the inflow strip 38, said strip edge 40 extending parallel, i.e. vertically to the drawing plane in FIG. 5, and the filter element edge 32 that is provided with the sealing strip 35, a movement gap 41 is formed, whose gap width S changes in the course of the conveying of the filter belt 13 in such a manner that it reaches a maximum ($S_{max}$) in the straight conveying section 52 of the filter belt 13 illustrated in FIG. 9 and a minimum ($S_{min}$) in a deflection area 26, 27, as illustrated in FIG. 3.

The sealing strip 35 has an attachment portion 42, which is adjacent to the elastic deformation portion 36 and is attached with a connection profile 43 to the filter element edge 32. The connection profile 43 is shaped as an L-profile having a connecting web 44 (FIG. 5), which is used for connection with the attachment portion 42 of the sealing strip 35. The attachment portion 42 extends parallel to the connecting web 44 of the connection profile 43 in the inflow direction 45 of the filter elements, the inflow direction 45 of the filter elements, as mentioned in the beginning, being oriented transverse to the flow direction 17 of the conveyor belt filter device 10 because of the center flow position of the filter device 10.

Via a connection leg 46, the connection profile 43 is connected to the filter element edge 32, which in the present case is formed by a hollow profile having a rectangular cross-section.

The inflow strip 38 is formed by a profile leg 47 of a connection profile 48 that is attached to the filter element edge 31 and in the present case is formed substantially correspondingly with the connection profile 43, which is used to connect the sealing strip 35 to the filter element edge 32.

As is shown in particular in FIG. 5, in the straight conveying section 52, the distance between the deformation portion 36 of the sealing strip 35 and the filter element edge 31 on which the inflow strip 38 is arranged is larger than the distance between the deformation portion 36 and the filter element edge 32 on which the sealing strip 35 is arranged. Thus, in the straight conveying section of the chain drive, the deformation portion 36 is located in the area of the strip edge 40 of the inflow strip 38.

In comparison, the deformation portion 36, which achieves the sealing effect with respect to the sealing surface 37 of the inflow strip 38, is located in a deflection area 27 of the chain drive 14, said deflection area 27 being illustrated in FIGS. 7 and 8, in which adjacent filter elements 19 are pivoted against one another about a horizontal joint axis 49 (FIG. 6) formed between the chain members 23 of the adjacent filter elements 19, offset to the sealing edge 40 by a sealing length dx denoted in FIG. 8. Accordingly, the gap width $S_{min}$ is reduced by the sealing length dx in the deflection area between the strip edge 40 and the filter element edge 32 as compared to the gap width $S_{max}$ in the straight conveying section 52 (FIG. 5). To seal the filter gap 34, the deformation portion 36 of the sealing strip 35 undergoes a relative move or relative shift on the sealing surface 37 of the inflow strip 38.

Figure 9:
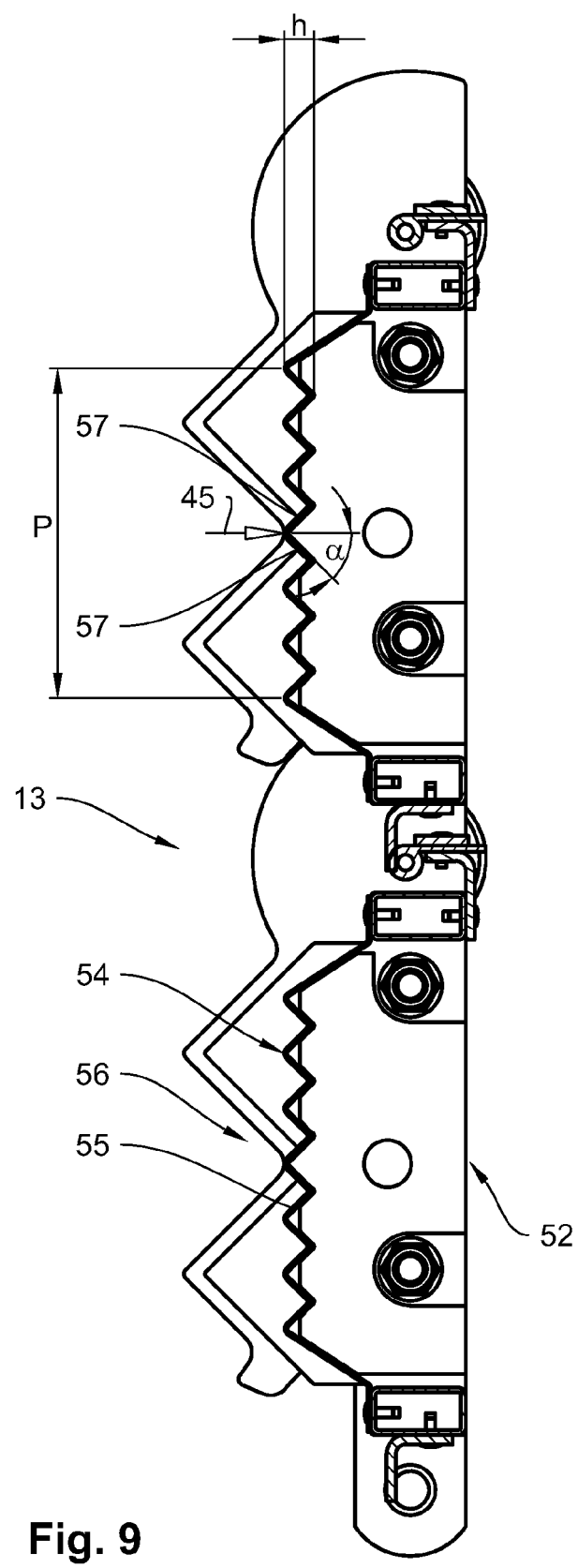
FIG. 9 shows an enlarged partial section illustration of a straight conveying section of the conveyor belt filter device illustrated in FIG. 3 including a second embodiment of filter elements.

In FIGS. 9, 10 and 11, the filter belt 13 is illustrated with filter elements 56, each of which has a filter cage 54, which in the present case is formed like the filter cage 53 by a perforated plate material. In deviation from the inflow bottom 25 of the filter cage 53, the filter element 56 has a filter cage 54 with an inflow bottom 55 that is repeatedly folded in an alternating manner and which has a saw tooth profile in the present embodiment example. In comparison to the profile illustrated in particular in FIG. 5, the inflow bottom 55 has a multiply M-shaped profile. Owing to the plurality of flow-through flanks 57, which are inclined at an attack angle α toward the inflow direction 45, the inflow surface A (FIG. 11) of the inflow bottom 55 is a multiple of the projection surface P (FIG. 9) transverse to the inflow direction 45 while having a lower bottom height h.

In this way, it is possible in particular to also guide a surface bottom G of the soiled inflow surface A (FIG. 11) of the inflow bottoms 55 with the smallest possible distance z past a nozzle device that is arranged in the area of the filtered matter discharge 15 (FIG. 3) in a nozzle plane 58, said nozzle device treating the inflow bottoms 55 with water.

Filter elements that have an inflow bottom 55 allow a reduced maintenance effort owing to the improved cleaning possibility also irrespective of the manner in which a gap seal sealing the filter gap of a conveyor belt filter device is realized, which is used to mechanically clean a liquid that is polluted with solids and flows in a sewer or the like, the conveyor belt filter device being provided with an endless filter belt formed by filter elements that are connected to one another and can each be pivoted against one another about a horizontal joint axis and with one flexible drive means being provided on either side of the filter belt, said drive means being deflected by way of deflection elements in deflection areas, filter elements being laterally attached to said drive means, and the conveyor belt filter device having a frame that supports the deflection elements and the filter belt, the filter elements having filter element edges that extend parallel to the joint axes and a filter gap being formed between opposing filter element edges of adjacent filter elements, said filter gap having a gap seal that seals the filter gap.

| List of reference signs | |
|---|---|
| 10 | conveyor belt filter device |
| 11 | sewer |
| 12 | frame |
| 13 | filter belt |
| 14 | chain drive |
| 15 | filtered matter discharge |
| 16 | |
| 17 | flow direction |
| 18 | sewer bottom |
| 19 | filter element |
| 20 | lateral bulkhead plate |
| 21 | central bulkhead plate |
| 22 | drive chain |
| 23 | chain member |
| 24 | sewer wall |
| 25 | inflow bottom |
| 26 | deflection area |
| 27 | deflection area |
| 28 | deflection shaft |
| 29 | |
| 30 | chain wheel |
| 31 | filter element edge |
| 32 | filter element edge |
| 33 | gap seal |
| 34 | filter gap |
| 35 | sealing strip |
| 36 | deformation portion |
| 37 | sealing surface |
| 38 | inflow strip |
| 39 | inflow surface |
| 40 | strip edge |
| 41 | movement gap |
| 42 | attachment portion |
| 43 | connection profile |
| 44 | connecting web |
| 45 | inflow direction |
| 46 | connection leg |
| 47 | profile leg |
| 48 | connection profile |
| 49 | joint axis |
| 50 | cover |
| 51 | side wall |
| 52 | conveying section |

-continued

| | List of reference signs |
|---|---|
| 53 | filter cage |
| 54 | filter cage |
| 55 | inflow bottom |
| 56 | filter element |
| 57 | flow-through flank |
| 58 | nozzle plane |

The invention claimed is:

1. A conveyor belt filter device (10) for mechanically cleaning a liquid that is polluted with solids and flows in a sewer (11) or the like, comprising an endless filter belt (13) formed by filter elements (19) that are connected to one another and can each be pivoted against one another about a horizontal joint axis (49), and one flexible drive means provided on either side of the filter belt, said drive means being deflected by way of deflection elements in deflection areas (26, 27), filter elements being laterally attached to said drive means, and a frame (12) that supports the deflection elements and the filter belt, the filter elements having filter element edges (31, 32) that extend parallel to the joint axes and a filter gap (34) that has a gap seal (33) sealing the filter gap (34) being formed between opposing filter element edges of adjacent filter elements, said gap seal having a compressible sealing strip (35) that is arranged on one filter element edge (32),
characterized in that
an inflow strip (38) is arranged at the filter element edge (31), that is opposite to the filter element edge (32) that is provided with the sealing strip (35) the flow impinging on the inflow surface (39) of the inflow strip (38), said inflow strip extending parallel to the sealing strip and having a sealing surface (37) that is located opposite of the inflow surface and is in contact with the sealing strip, such that the inflow strip serves as a cover protecting the sealing strip from the inflow, a movement gap (41) being formed between a strip edge (40) of the inflow strip, and the edge of the filter element (32) that is provided with the sealing strip (35) said strip edge extending parallel to the sealing strip.

2. The conveyor belt filter device according to claim 1, characterized in that
the movement gap (41) is formed in such a manner that the gap width is at maximum ($S_{max}$) in a straight conveying section (52) of the filter belt (13) and at minimum ($S_{min}$) in a deflection area (26, 27) of the filter belt.

3. The conveyor belt filter device according to claim 1, characterized in that
the sealing strip (35) has an elastic deformation portion (36) in contact with the inflow strip (38) and an attachment portion (42), a connection profile (43) of the attachment portion being attached to the filter element edge (32) in such a manner that the deformation portion is arranged at a distance to the two opposing filter element edges (31, 32).

4. The conveyor belt filter device according to claim 3, characterized in that
the attachment portion (42) of the sealing strip (35) extends parallel to a connecting web (44) of the connection profile (43) in the inflow direction (45) of the filter elements (19).

5. The conveyor belt filter device according to claim 4, characterized in that
the connecting web (44) is formed by a profile leg of a connection profile (43) that is shaped as an L-profile.

6. The conveyor belt filter device according to claim 1, characterized in that
in the straight conveying section (52) of the filter belt (13), the distance between the deformation portion (36) and the filter element edge (31) at which the inflow strip (38) is arranged is larger than the distance between the deformation portion and the filter element edge (32) at which the sealing strip (35) is arranged.

7. The conveyor belt filter device according to claim 1, characterized in that
the inflow strip (38) is formed by a profile leg of a connection profile (48) that is attached to the filter element edge (31).

8. The conveyor belt filter device according to claim 7, characterized in that
the connection profile (48) is shaped as an L-profile.

9. The conveyor belt filter device according to claim 1, characterized in that the filter element edges (31, 32), on which the inflow strip (38) and the sealing strip (35) are arranged, are formed by a hollow profile having a rectangular cross-section.

* * * * *